July 26, 1938.  E. G. SIMPSON ET AL  2,124,754
SEAT ADJUSTER
Filed May 27, 1936   5 Sheets-Sheet 1
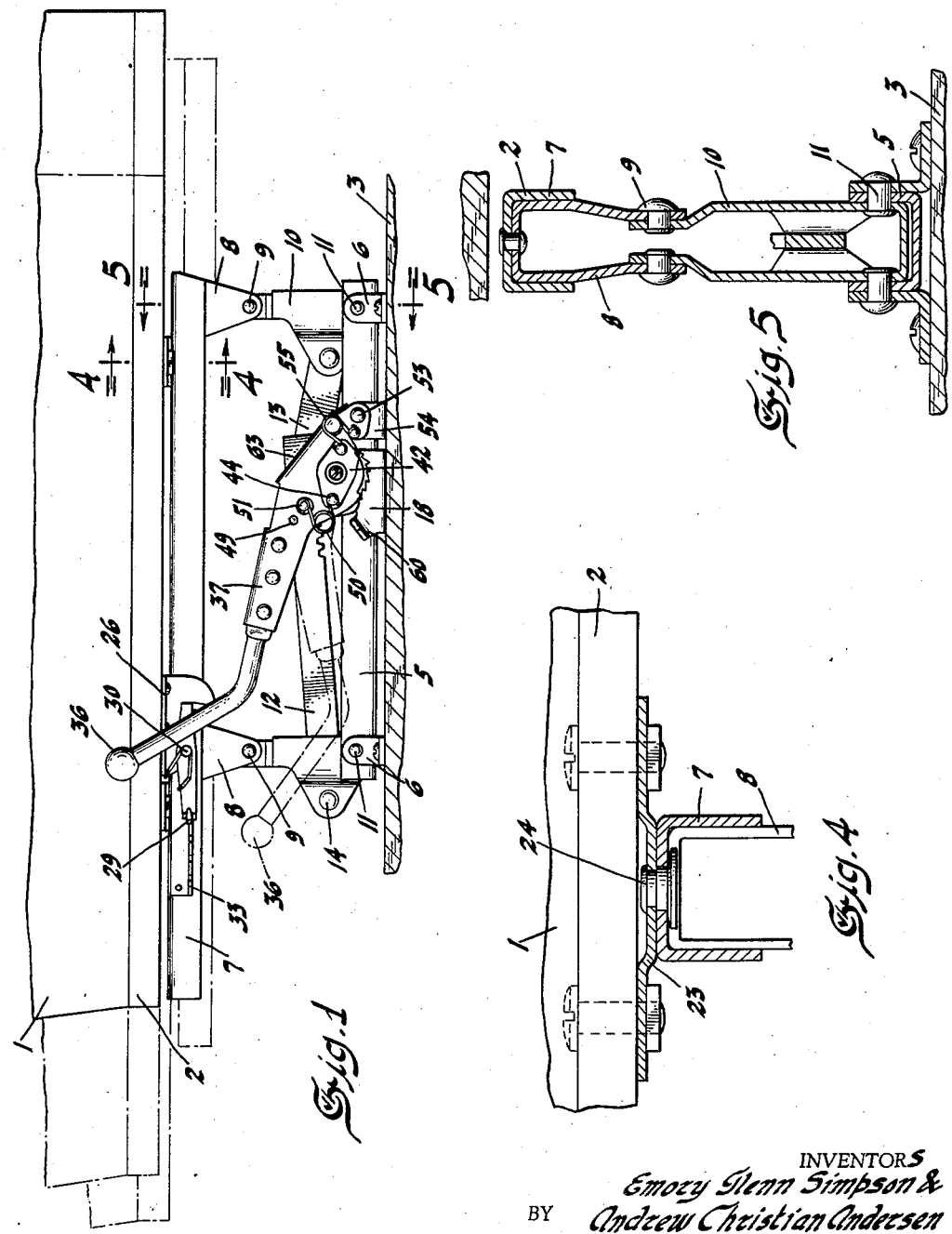

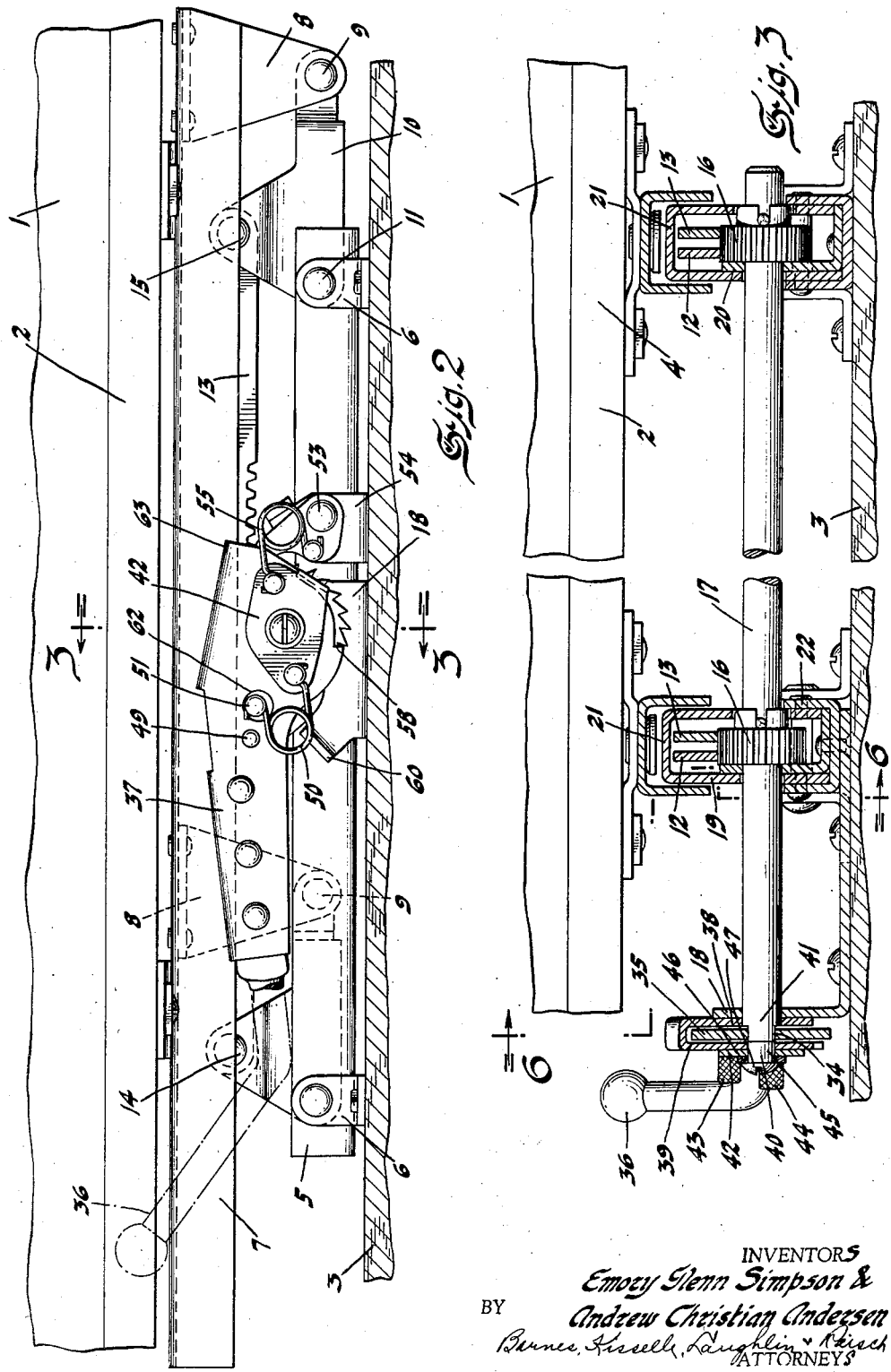

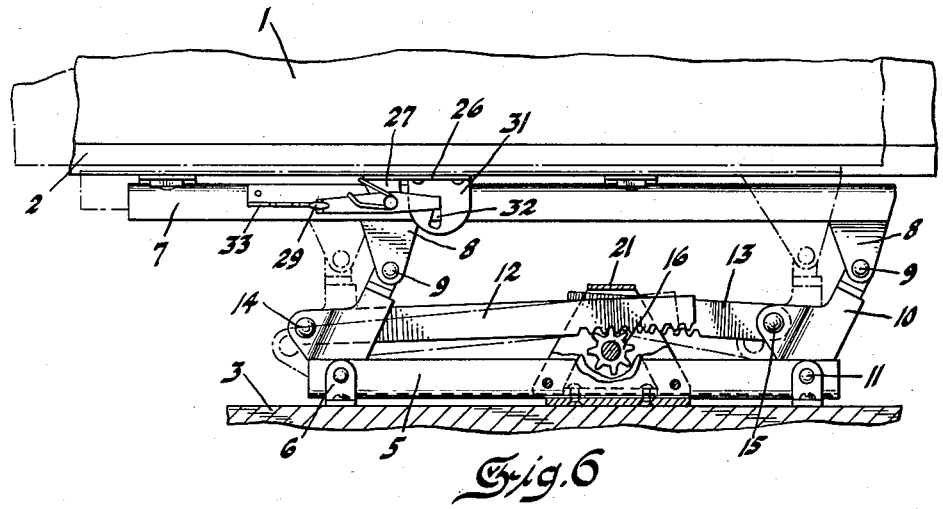
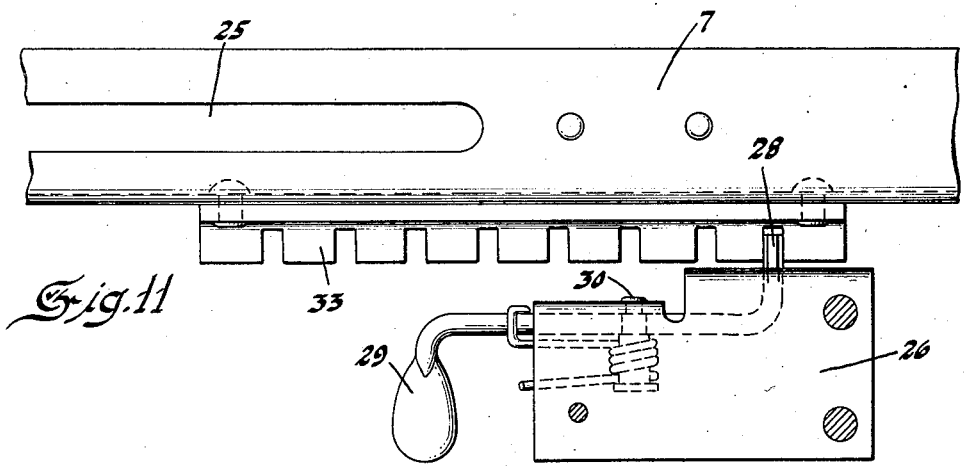
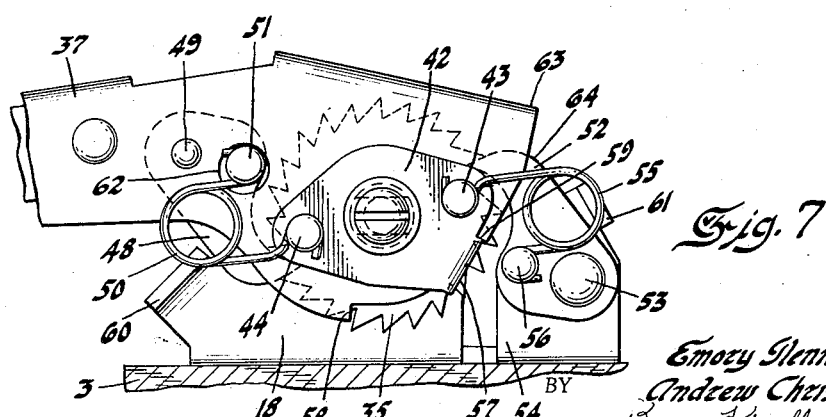

July 26, 1938. E. G. SIMPSON ET AL 2,124,754
SEAT ADJUSTER
Filed May 27, 1936 5 Sheets-Sheet 4

INVENTORS
Emory Glenn Simpson &
BY Andrew Christian Andersen
Barnes, Kisselle, Laughlin & Raisch
ATTORNEYS

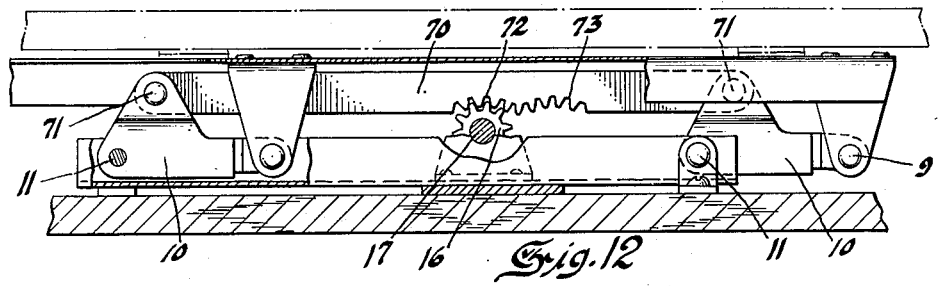
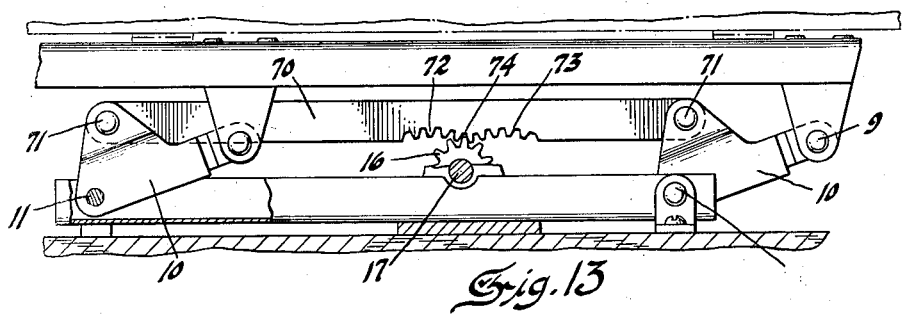
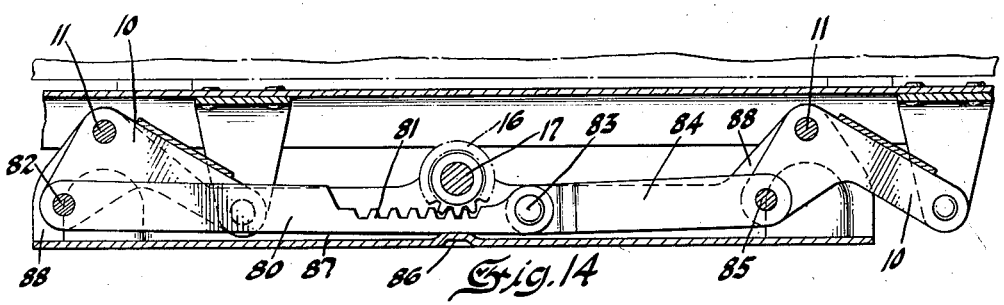
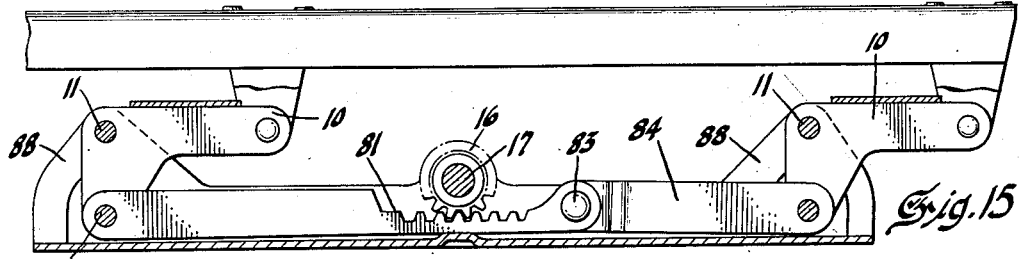
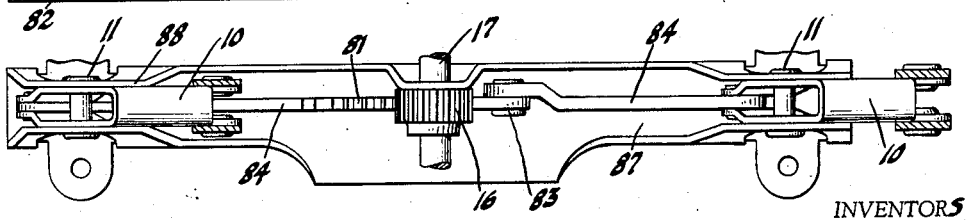

Patented July 26, 1938

2,124,754

UNITED STATES PATENT OFFICE 2,124,754

SEAT ADJUSTER

Emory Glenn Simpson and Andrew Christian Andersen, assignors to Ternstedt Manufacturing Company, Detroit, Mich., a corporation of Michigan Application May 27, 1936, Serial No. 82,054

7 Claims. (Cl. 155—88)

This invention relates to a seat adjuster and more particularly to a seat adjuster for adjusting an automotive vehicle seat upwardly and downwardly.

It is an object of this invention to produce a vehicle seat adjuster by means of which the seat can be conveniently and easily raised or lowered, either by the occupant of the seat or one who is not occupying the seat, to any position desired within the range of adjustment.

As a general rule the interior of a vehicle body is designed to give the greatest space or room possible for occupancy by the passengers and driver as one of the elements contributing to their bodily comfort. It is also an object of this invention to produce an adjuster for raising and lowering a vehicle seat which is compact and therefore well adapted for installation and operation within an automobile body within the limited amount of space which can be reasonably allotted to such a device.

In the drawings:

Fig. 1 is a side elevation showing the seat adjuster with the seat raised.

Fig. 2 is also a side elevation showing the seat lowered.

Fig. 3 is a section along the line 3—3 of Fig. 2.

Fig. 4 is a section along the line 4—4 of Fig. 1.

Fig. 5 is a section along the line 5—5 of Fig. 1.

Fig. 6 is a section along the line 6—6 of Fig. 3 but with the seat in raised position.

Fig. 7 is a detail of the pawl and ratchet showing the position of the parts when the adjuster is arranged for raising the seat and the lever has reached the end of the elevating stroke.

Fig. 11 is a detail of the latch for latching the seat against fore and aft adjustment.

Figs. 12 and 13 show a modified form of rack bar for transmitting the lifting torque to the parallelogram.

Figs. 14, 15 and 16 show a second modified form of rack bar for transmitting the lifting torque to the parallelogram.

Figure 10:
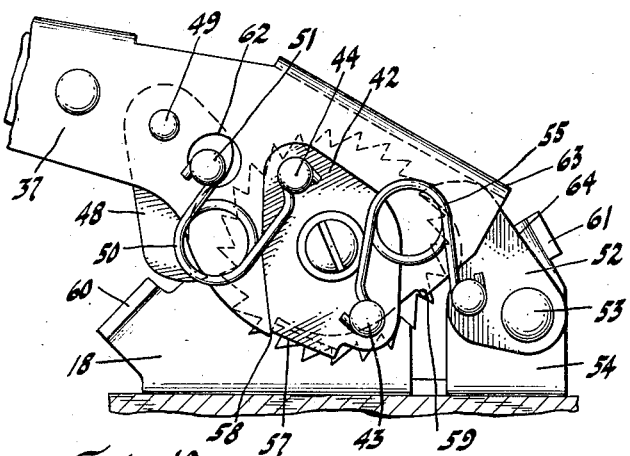
Fig. 10 is a view similar to Fig. 9 but showing the position of the parts at the end of a lowering step.

Referring more particularly to the drawings there is shown a vehicle seat cushion 1 having a bottom frame 2. The seat is supported on the floor 3 of the vehicle body by a pair of parallelogram supports generally designated 4, one of which is positioned fore and aft of the vehicle body adjacent one side of the seat and the other adjacent the other side of the seat (Fig. 6). Since both of these parallelogram supports are the same only one will be described. Each parallelogram support comprises a bottom rail 5 of channel section which is fixed to the floor by means of the L brackets 6 and an upper rail 7 of channel section. The top rail is pivotally supported adjacent each end on the bottom rail 7 by a pair of levers 10 and thus the top and bottom rails 7 and 5 are at all times parallel. The top rail 7 has fixed at each end a depending U shaped bracket 8. Each bracket 8 is pivotally connected as at 9 to a lever 10 which in turn is pivotally connected to the bottom rail 5 as at 11.

A pair of draft links in the form or rack bars 12 and 13 connect the levers 10. The rack 12 has one end pivotally connected to one of the levers 10 as at 14 and the other rack 13 has one of its ends connected to the other lever 10 as at 15. Racks 12 and 13 mesh with driving gear 16 fixed upon the driving shaft 17. The driving shaft 17 is journaled in the support brackets 18, 19 and 20 which are fixed to the floor 3 of the vehicle body. The racks 12 and 13 are held in mesh with the gear 16 by the inverted U shaped tie-down bracket 21 which is fixed in the bottom rail 5 as at 22.

The seat bottom 2 has bolted or otherwise secured thereto the plates 23, each of which has riveted or otherwise fixed thereto a headed pin 24. These pins 24 slidably interengage the top rails 7 in the elongated slots 25 to permit fore and aft sliding adjustment of the seat along the top rails 7.

The seat frame 2 has fixed thereto a plate 26 having a depending flange 27. A pawl 28 having a finger piece 29 is supported by means of a pivot pin 30 upon flange 27. The plate 26 is also provided with a flange 31 having a slot 32 through which the pawl 28 projects and swings. A rack 33 is fixed to the depending side wall of the top rail 7 and is arranged to be interengaged by the pawl 28 to latch the seat against fore and aft adjustment along the top rails 7.

The vertical upwardly and downwardly adjustment of the seat is effected by means of a pawl and ratchet mechanism. The driving shaft 17 has a flattened end portion 34 upon which is fixed the ratchet 35. A handle portion 36 is riveted to a bifurcated lever 37 having the furcations 38 and 39 which are rotatably mounted upon cylindrical portions of the shaft 17 as at 40 and 41. A shifter plate 42 having the finger pieces 43 and 44 is also rotatably mounted upon the cylindrical end portion 45 of the shaft 17. The shifter plate 42, lever 37 and ratchet 35 are all held upon the end of the shaft by means of a washer 46 and screw 47 in the end of the shaft.

The ratchet is operated by a driving pawl 48 pivotally mounted by pin 49 upon the lever 37. An overcenter acting type of coil spring 50 has one end interengaged with a pin 51 carried by the pawl 48 and the other end engaged with the pin 44 on shifter plate 42. A dogging pawl 52 is pivotally mounted by means of the pin 53 upon a bracket 54 bolted or otherwise secured to the floor of the vehicle body. An over-center acting type of coil spring 55 has one end secured to the pin 43 on the shifter plate 42 and the other end secured to the pin 56 carried by the pawl 52. The shifter plate 42 is provided with an inwardly turned stop lug 57 which swings between the stops 58 and 59 on the lever 37.

The operation of the device is as follows: When the seat is in lowered position, as shown in Fig. 2, and it is desired to raise the seat, the shifter plate 42 is either in, or shifted to, the position shown in Fig. 7 so that the stop lug 57 abuts the stop 59. At this time the over-center springs 50 and 55 urge both pawls 48 and 52 into interengagement with the teeth of the ratchet 35. When the lever handle 36 is raised, pawl 52 holds the ratchet 35 against clockwise movement and the pawl 48 rides clockwise along the teeth of the ratchet. On the down stroke of the lever 37, pawl 48 interengages one of the teeth of the ratchet and rotates it counter-clockwise. The downward movement of the handle 36 may be arrested in any suitable fashion, such as when the pawl 48 abuts the lug 60 on the plate 18. During the counter-clockwise movement of the ratchet 35, the pawl 52 rides along the ratchet and snaps from behind one ratchet tooth to behind the succeeding ratchet tooth and holds the ratchet against turning whenever the lifting force is removed from the handle 36. As the ratchet 35 turns in a counter-clockwise direction the shaft 17 and gears 16 move the rack draft bars 12 and 13 to the left, Fig. 2, thereby swinging the levers 10 in a counter-clockwise direction to elevate the seat.

Figure 8:
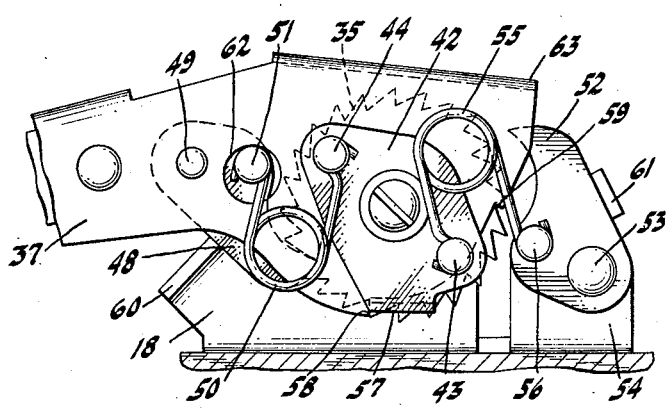
Fig. 8 is a detail showing the position of the parts at the beginning of a lowering step.
Figure 9:
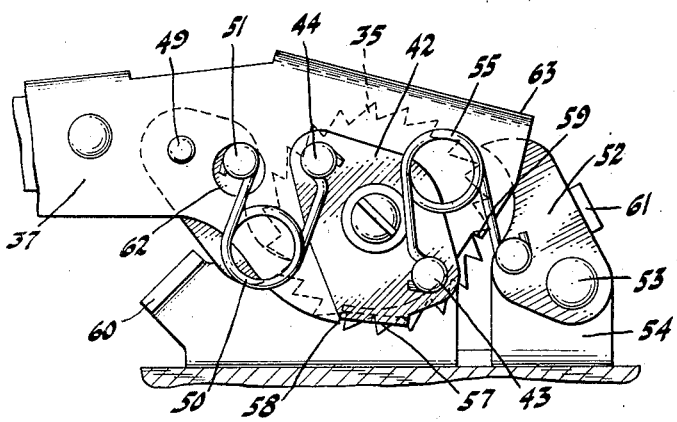
Fig. 9 is a view similar to Fig. 8 showing the position of the parts as the seat is being lowered under the control of the lever handle.

To lower the seat the shifter plate 42 is manually swung clockwise to the position shown in Figs. 8 to 10 with the stop lug 57 abutting stop 58 on the lever 37. At this time the over-center springs urge both of the pawls 48 and 52 away from the ratchet 35. Spring 55 yieldably holds the pawl 52 against the stop lug 61 on the bracket 54 and spring 50, when the pawl 48 clears lug 60 (Fig. 10), yieldably holds the pin 51, carried by pawl 48, against the circumference of the circular opening 62 in the lever 37 which arrests the movement of the pawl 48 away from the ratchet 35. If the handle 36 is now raised clockwise (Fig. 10), the end portion 63 of the lever which overhangs the pawl 52 will engage the face 64 of the pawl and cam it inwardly into engagement with the ratchet to prevent clockwise movement of the ratchet. If the lever is now swung downwardly or counter-clockwise (as viewed in Fig. 8), the pawl 48 strikes the lug 60 which cams it into engagement with the ratchet 35. Further downward movement of the lever turns the ratchet 35 and permits pawl 52 to snap out of engagement with the ratchet as shown in Fig. 8 because the part 63 of the lever 37 is now swung out of engagement with pawl 52. This permits the seat to lower and the weight of the seat or the combined weight of the seat and the occupant acting through the levers 10, draft bars 12 and 13, gears 16, and shaft 17 rotates the ratchet 35 in a clockwise direction, but this rotation and lowering of the seat are controlled by the operator through the lever 36, 37 as shown in Fig. 9. However, as soon as the ratchet 35 rotates sufficiently far clockwise, preferably one tooth, under the control of the lever handle 36, the part 63 again cams pawl 52 into engagement with the ratchet to arrest further rotation of the ratchet and further downward movement of the seat until the handle 36 is again forced down counter-clockwise to release the pawl 52 and the operation repeated as above described.

During the raising and lowering of the seat the levers 10 swing about pivots 11 thereby causing pivots 14 and 15 to travel in an arc. Since pivots 14 and 15 travel in an arc it follows that during the raising and lowering of the seat the racks 12 and 13 swing about the gears 16 as shown in the dotted lines, Fig. 6.

Instead of using two rack bars 12 and 13 to interconnect each set of levers 10, a single rack bar 70 can be used as shown in Figs. 12 and 13 to interconnect levers 10. This single rack bar is pivoted at each end to the levers 10 as at 71. In raising the seat from lowered position (shown in Fig. 12) to completely raised position (shown in Fig. 1), the pivot points 71 will first travel upwardly until they are in vertical alignment with the pivot points 11 and then downwardly. This travel of the pivot points 71 during the raising of the seat first raises the draft rack 70 and then lowers it with respect to the shaft 17 and gear 16. To maintain the rack meshed at all times during the raising and lowering of the seat with the gear 16 the rack teeth are formed in two arcs 72 and 73. As shown in Fig. 12, the seat is lowered and gear 16 is meshed with the rack at substantially the mid-point of the arc 72. As the seat is raised the rack travels to the left, Fig. 12, along the gear 16 until the gear 16 reaches the high point 74 of the rack. As shown in Fig. 13 the rack bar 70 has nearly reached high point of its upward travel and at this time the gear 16 meshes with the rack substantially at the junction or high point 74 of the two arcs 72 and 73. Further upward movement of the seat from the position shown in Fig. 3 will cause the rack bar 70 to lower and the gear 16 will travel from the position shown in Fig. 13 to substantially the mid-point of the arc 73.

In Figs. 14 to 16 there is shown a second modified form of rack bar. In this construction the levers 10 are connected by a straight rack bar 80 having teeth 81 which engage the gear 16 beneath the shaft 17. Rack 80 is pivoted to lever 10 at one end as at 82 and the other end of the pivot is connected as at 83 to one end of a link 84. The other end of the link 84 is pivotally connected to the lever 10 as at 85. The rack 81 is held in mesh with the gear 16 by the projection 86 which is stamped or formed upwardly from the plate 87. The plate 87 supports the brackets 88 which support the pins 11 upon which the levers 10 are pivoted. This arrangement permits the rack 80 to swing about the gear 16 as shown in Figs. 14 and 15 during the raising and lowering of the seat.

We claim:
1. In an automotive vehicle body, a seat adjuster for raising and lowering a vehicle seat comprising a pair of levers positioned in spaced relation one behind the other for supporting the seat, each lever having one end pivotally connected to the seat and the other end pivotally connected to the floor of the vehicle body, a rotatable shaft mounted upon the floor of the vehicle body between the said levers, a gear fixed to the said shaft, a rack bar meshed with the said gear and pivotally connected to one of said levers between the pivoted ends of the said lever, a lever operatively connected to the said shaft for turning the same to raise the seat, and means for latching the said shaft and gear against rotation.

2. In an automotive vehicle body, a seat adjuster for raising and lowering a vehicle seat comprising a pair of levers positioned in spaced relation one behind the other for supporting the seat, each lever having one end pivotally connected to the seat and the other end pivotally connected to the floor of the vehicle body, a rotatable shaft mounted upon the floor of the vehicle body between the said levers, a gear fixed to the said shaft, rack means meshed with the said gear on the shaft and pivotally connected to both of the said levers between the pivoted ends of each of the levers to interconnect the said two levers, a lever operatively connected to the said shaft for turning the same to raise the seat, and means for latching the said shaft and gear against rotation.

3. In an automotive vehicle body, a seat adjuster for raising and lowering a vehicle seat comprising a pair of levers positioned in spaced relation one behind the other for supporting the seat, each lever having one end pivotally connected to the seat and the other end pivotally connected to the floor of the vehicle body, a rotatable shaft mounted upon the floor of the vehicle body between the said levers, a gear fixed to the said shaft, a rack bar meshed with the said gear and pivotally connected to one of said levers between the pivoted ends of the said lever, a lever operatively connected to the said shaft for turning the same to raise the seat, means for latching the said shaft and gear against rotation, and tie down means for holding the rack bar in mesh with the said gear.

4. In an automotive vehicle body, a seat adjuster for raising and lowering a vehicle seat comprising an extensible support secured to the seat and the floor of the vehicle body and adapted to be raised and lowered in the raising and lowering of the said seat, a rotatable shaft and a gear fixed on the said shaft, a bearing support for the said shaft mounted on the floor of the vehicle, a lever handle freely rotatably mounted on the said shaft, a ratchet fixed on the said shaft, a pawl pivotally mounted on the said lever handle and a pawl pivotally supported on the floor of the vehicle, a shiftable plate and a pair of over-center springs interconnecting the said shifter plate and the said pawls whereby the said shifter plate can be shifted so that the over-center springs throw both of the said pawls into engagement with the said ratchet so that the lever handle can be swung to rotate said shaft and gear, and means operatively connecting said gear and extensible support whereby when the lever handle is swung to rotate said shaft and gear the said seat is raised or lowered.

5. In an automotive vehicle body, a seat adjuster for raising and lowering a vehicle seat comprising an extensible support secured to the seat and the floor of the vehicle body and adapted to be raised and lowered in the raising and lowering of the said seat, a rotatable shaft and a gear fixed on the said shaft, a bearing support for the said shaft mounted on the floor of the vehicle, a lever handle freely rotatably mounted on the said shaft, a ratchet fixed on the said shaft, a pawl pivotally mounted on the said lever handle and a pawl pivotally supported on the floor of the vehicle, a shiftable plate and a pair of over-center springs interconnecting the said shifter plate and the said pawls, a pair of stops carried by the said lever handle for limiting the shifting movement on the said shiftable plate whereby the said plate can be shifted into engagement with one of the said stops to cause the over-center springs to throw the pawls into engagement with the ratchet to permit operation of the lever handle to rotate said shaft and gear in one direction to raise the seat and shifted against the other of said stops to cause the over-center springs to urge the pawls out of engagement with the ratchet to permit operation of the lever handle to rotate said shaft and gear in the opposite direction to lower the said seat, and means operatively connecting said gear and extensible support whereby when the lever handle is swung to rotate said shaft and gear the said seat is raised or lowered.

6. In an automotive vehicle body, a seat adjuster for raising and lowering a vehicle seat comprising an extensible support secured to the seat and the floor of the vehicle body and adapted to be raised and lowered in the raising and lowering of the said seat, a rotatable shaft and a gear fixed on the said shaft, a bearing support for the said shaft mounted on the floor of the vehicle, a lever handle freely rotatably mounted on the said shaft, a ratchet fixed on the said shaft, a pawl pivotally mounted on the said lever handle and a pawl pivotally supported on the floor of the vehicle, a shiftable plate and a pair of over-center springs interconnecting the said shifter plate and the said pawls, a pair of stops carried by the said lever handle for limiting the shifting movement on the said shiftable plate whereby the said plate can be shifted into engagement with one of the said stops to cause the over-center springs to throw the pawls into engagement with the ratchet to permit operation of the lever handle to rotate said shaft and gear in one direction to raise the seat and shifted against the other of said stops to cause the over-center springs to urge the pawls out of engagement with the ratchet to permit operation of the lever handle to rotate said shaft and gear in the opposite direction to lower the said seat, and a pair of stops against which the pawls abut when the plate is shifted over center and the springs yieldably urge the said pawls away from the said ratchet, and means operatively connecting said gear and extensible support whereby when the lever handle is swung to rotate said shaft and gear the said seat is raised or lowered.

7. In an automotive vehicle body, a seat adjuster for raising and lowering a vehicle seat comprising an extensible support secured to the seat and the floor of the vehicle body and adapted to be raised and lowered in the raising and lowering of the said seat, a rotatable shaft and a gear fixed on the said shaft, a bearing support for the said shaft mounted on the floor of the vehicle, a lever handle freely rotatably mounted on the said shaft, a ratchet fixed on the said shaft, a pawl pivotally mounted on the said lever handle and a pawl pivotally supported on the floor of the vehicle, a shiftable plate and a pair of over-center springs interconnecting the said shifter plate and the said pawls, a pair of stops carried by the said lever handle for limiting the shifting movement on the said shiftable plate whereby the said plate can be shifted into engagement with one of the said stops to cause the over-center springs to throw the pawls into engagement with the ratchet to permit operation of the lever handle to rotate said shaft and gear in one direction to raise the seat and shifted against the other of said stops to cause the over-center springs to urge the pawls out of engagement with the ratchet to permit operation of the lever handle to rotate said shaft and gear in the opposite direction to lower the said seat, a pair of stops supported on the said lever handle and floor against which the pawls abut when the plate is shifted over center and the springs yieldably urge the said pawls away from the said ratchet, and a pair of cams one of which is supported on the floor of the vehicle and the other of which is carried by the said lever whereby to lower the said seat the one cam is slidably engaged by the pawl carried by the said lever as the lever is turned in one direction to throw the same into engagement with the said ratchet to disengage the other pawl to permit the lowering of the seat under the control of the lever handle and whereby the other cam as the lever is turned in the opposite direction slidably engages the other pawl to throw the same into engagement with the ratchet to terminate a lowering step and hold the seat against further lowering until the lever handle can be returned to the initial position to repeat the lowering step, and means operatively connecting said gear and extensible support whereby when the lever handle is swung to rotate said shaft and gear the said seat is raised or lowered.

EMORY GLENN SIMPSON.
   ANDREW CHRISTIAN ANDERSEN.